United States Patent [19]

Lin

[11] Patent Number: 5,591,910
[45] Date of Patent: Jan. 7, 1997

[54] ACCELEROMETER

[75] Inventor: Tsen-Hwang Lin, Dallas, Tex.

[73] Assignee: Texas Instruments Incorporated, Dallas, Tex.

[21] Appl. No.: 253,799

[22] Filed: Jun. 3, 1994

[51] Int. Cl.⁶ ..................................... G01P 15/08
[52] U.S. Cl. .................... 73/514.38; 73/514.32; 200/61.45 R
[58] Field of Search ............. 73/517 R, 517 B, 73/514, 516 R, 514.01, 514.32, 514.38, 514.24, 514.16; 200/61.45 R

[56] References Cited

U.S. PATENT DOCUMENTS 4,736,629  4/1988  Cole .................................. 73/514.32
5,195,371  3/1993  Grieff ................................ 73/514.35
5,209,117  5/1993  Bennett ............................. 73/514.16

FOREIGN PATENT DOCUMENTS 0395922  11/1990  European Pat. Off. ............. 73/517 R
0480274   4/1992  European Pat. Off. ............. 73/517 R
 394168   4/1991  Japan ................................ 73/517 R Primary Examiner—Christine K. Oda
Attorney, Agent, or Firm—Carlton H. Hoel; W. James Brady, III; Richard L. Donaldson

[57] ABSTRACT

A plating of an inertial mass (207) in a micromechanical accelerometer (200) to increase sensitivity to smaller accelerations. The inertial mass (207) may be on a plate (206) suspended by hinges (208) over a sensing electrode (212) to measure displacement of the inertial mass (207) relative to the sensing electrode (212).

10 Claims, 6 Drawing Sheets

ACCELEROMETER

CROSS-REFERENCE TO RELATED APPLICATIONS

The following copending and coassigned patent applications contain related subject matter: Ser. No. 08/142,548, filed Oct. 22, 1993 and 08/268,759, filed Jun. 29, 1994. (TI-17904)

BACKGROUND OF THE INVENTION

The invention relates to electronic devices, and, more particularly, to integrated circuit accelerometers and methods of fabrication.

Accelerometers detect mechanical acceleration and typically provide an electrical output signal which depends upon the amplitude of the acceleration. Applications for accelerometers include crash detection for airbag activation in automobiles. Incorporating an accelerometer on an integrated circuit, such as illustrated in FIG. 1, permits signal conditioning circuitry and signal processing circuitry to be included with the accelerometer and potential low cost fabrication. Thus analysis of detected accelerations may be made on the same integrated circuit as the accelerometer itself. In an automobile crash the high acceleration should persist for a few milliseconds, so there is sufficient time for electronic analysis of the acceleration and consequent control signals for various actions, including deployment of an airbag. Analog Devices Inc. produced the ADXL50 integrated circuit accelerometer with capacitive detection of motion of an array of polysilicon fingers affixed to the surface of a silicon integrated circuit. This accelerometer was designed to detect accelerations up to ±50 g in one direction parallel to plane of the integrated circuit. See Electron Design, Aug. 8, 1991, pages 45–56. However, the inertial mass of the ADXL50 is not large and detection of smaller amplitude acceleration, such as ±1 g, would require an enormous array and not be practicable.

U.S. Pat. No. 5,192,395 discloses an integrated circuit accelerometer including an array of deflectable elements which are squares (50 μm long side) of an aluminum alloy and suspended about 2 μm over a contact by hinges connected to a ground plane. An acceleration which deflects a suspended square to the contact in effect closes a switch and this is electrically detected. The various deflectable elements have either differing masses or hinges with differing restoring constants. Thus a measurable acceleration will cause the elements with large masses or low restoring constants to deflect to their contacts but not the elements with small masses or high restoring constants. Thus detecting the transition from deflected-to-contact elements to not-sufficiently-deflected elements in the array gives a measure of the amplitude of the acceleration.

However, the known integrated circuit accelerometers have the problem of large size required for detection of small amplitude accelerations.

U.S. Pat. No. 4,954,789 discloses a spatial light modulator with an array of essentially square deflectable elements suspended by hinges connected to posts about the corners.

Electroless plating of nickel from either acidic or basic solutions of phosphorus or boron compounds as the reducing agent is known. In fact, electroless plating of nickel on roughened silicon for micromechanical structures such as interdigitated electrodes for a lateral resonant microactuator appears in Furukawa et al, Electroless Plating of Metals for Micromechanical Structures, Proc. Transducers (June 1993, Yokohama).

SUMMARY OF THE INVENTION

The present invention provides an integrated circuit accelerometer with a large inertial mass suspended by flexure hinges. The large inertial mass may be fabricated by electroless plating which permits control of the mass over a wide range.

This has the advantage of low amplitude acceleration detection with a simple integrated circuit accelerometer.

BRIEF DESCRIPTION OF THE DRAWINGS

The drawings are schematic for clarity.

DESCRIPTION OF THE PREFERRED EMBODIMENTS

Overview

The preferred embodiment accelerometers may be incorporated into integrated circuits as part of a structure built over or beside other circuit elements. The deflectable elements of the preferred embodiments are roughly square shaped, parallel to the underlying substrate, and suspended by flexure hinges. The preferred embodiment methods of fabrication control the thickness of the deflectable elements by electroless plating. The electroless plating can provide deflectable element thickness sufficient to detect less than 10 g accelerations with an element on the order of 100 μm square and with robust flexure hinges.

Capacitance detection

Figure 2A:
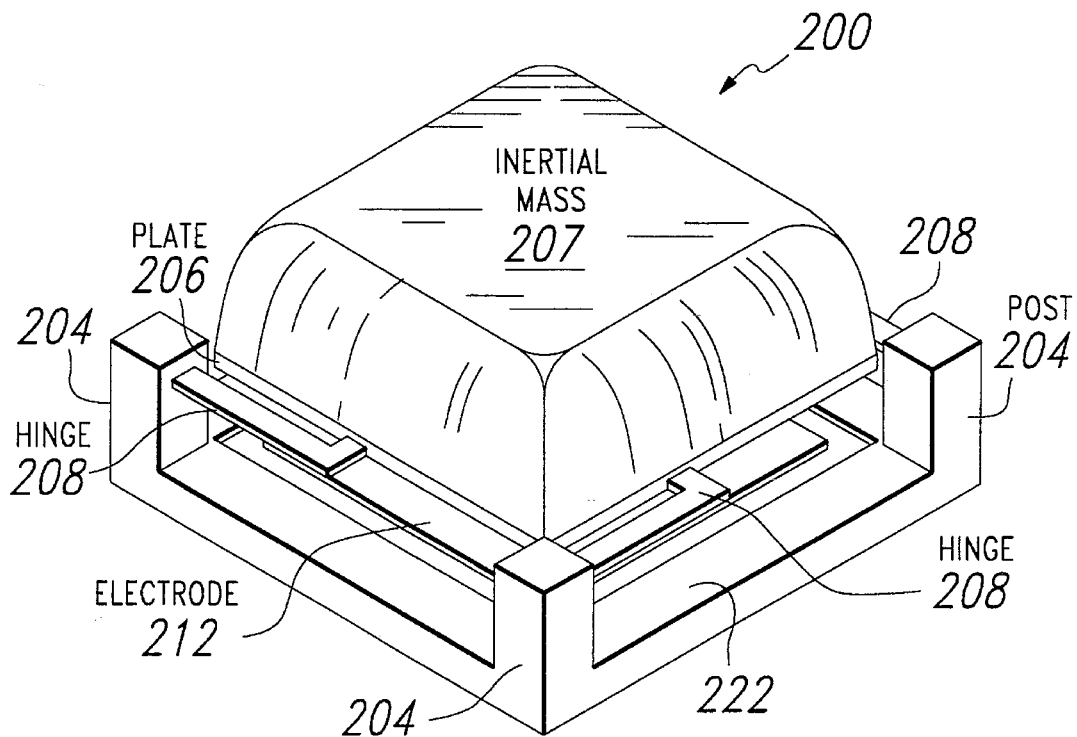
FIGS. 2a–c illustrate a first preferred embodiment in perspective, cross sectional elevation, and plan views.
Figure 2B:
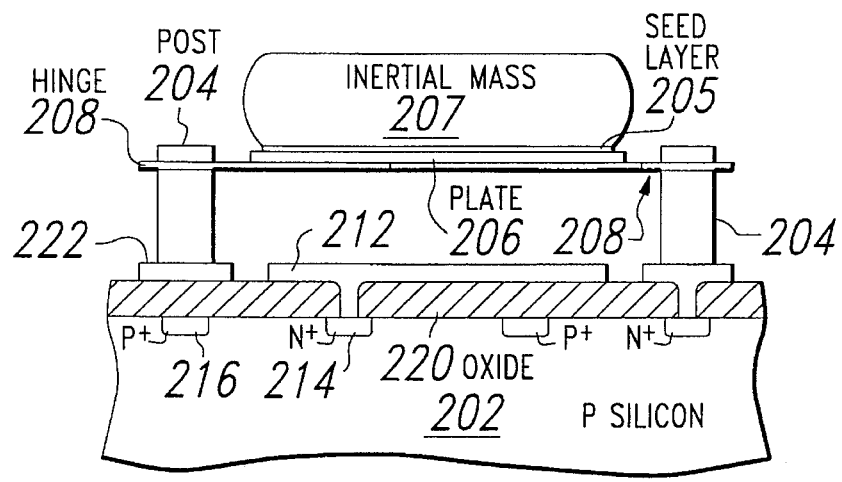
Figure 2C:
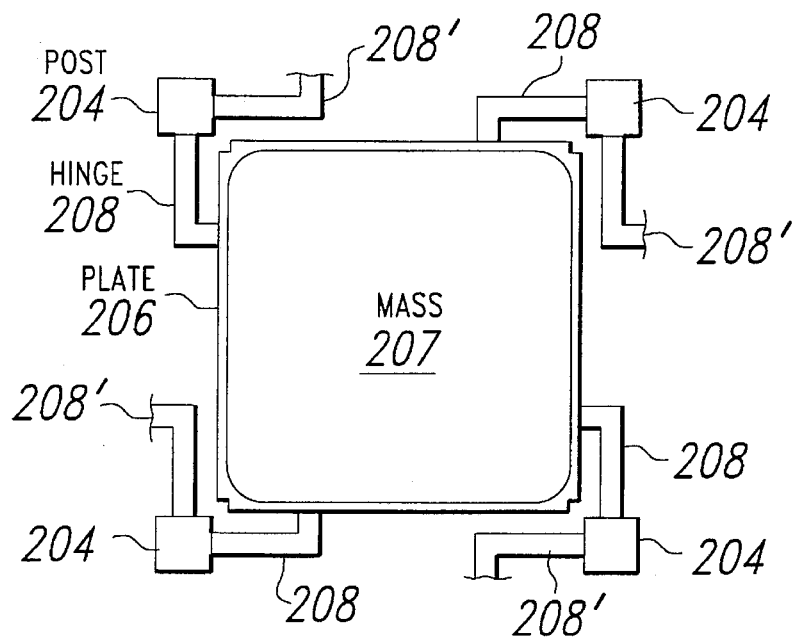

FIGS. 2a–c show a first preferred embodiment deflectable element for an accelerometer in perspective, cross sectional elevation, and plan views, respectively. The element, generally denoted with reference numeral 200, includes plate 206 with attached inertial mass 207 suspended over sensing electrode 212 by four flexure hinges 208 connected to four posts 204 located about the corners of plate 206. FIG. 2b also shows seed layer 205 used in the formation of inertial mass 207 and portions of underlying diffused conductors 214 and 216 in silicon substrate 202. FIG. 2c also shows hinges 208' available for support of adjacent other plates of other deflectable elements as could be used in a one-or two-dimensional array of such deflectable elements which have common grounded plates.

Figure 1:
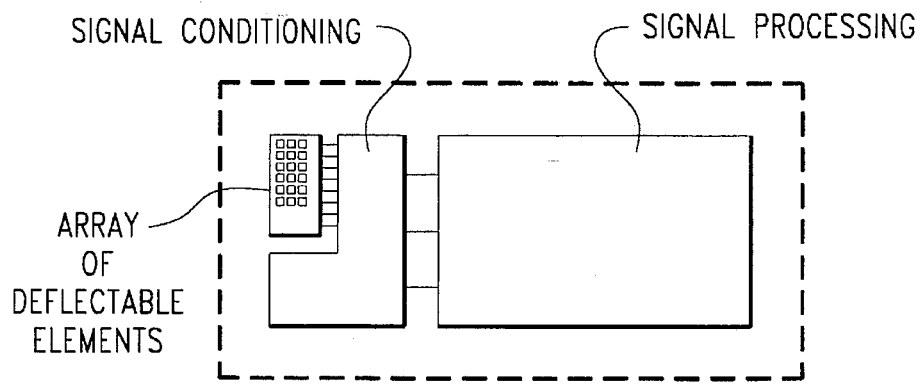
FIG. 1 heuristically illustrates an accelerometer array incorporated in an integrated circuit.

Typical dimensions and materials for element 200 are: aluminum plate 206 is 100 μm by 100 μm by 0.5 μm thick; nickel inertial mass 207 is between 10 and 100 μm square and between 10 and 50 μm thick; aluminum hinges 208 are 0.2 μm thick, 1 μm wide, and 10 μm long; tungsten posts 204 are 6 μm square and extend 1 μm from their supports 222. Silicon dioxide ("oxide") layer 220 isolates the posts and sensing electrode from substrate 202. Silicon substrate 202 may include CMOS circuitry positioned away from an array of deflectable elements, as illustrated in FIG. 1, and the deflectable elements may be fabricated after the CMOS circuitry has been completed.

Figure 3:
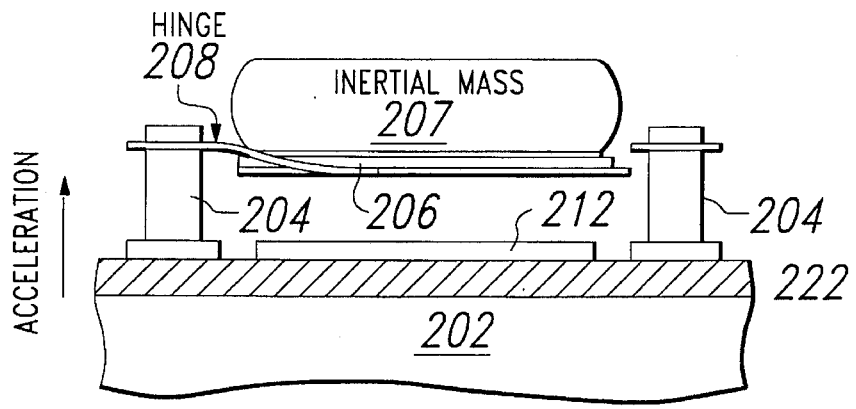
FIG. 3 indicates displacement under acceleration.

Deflectable element operates as follows. When substrate 202 is accelerated in a direction perpendicular to the plane of the substrate, this acceleration displaces inertial mass 207 and plate 206 relative to sensing electrode 212, and flexure hinges 208 provide a restoring force to return the inertial mass and plate to their original position. At equilibrium, the restoring force (hinge spring constant multiplied by the displacement) equals the acceleration multiplied by the mass of inertial mass 207 (plate 206 has negligible mass). If substrate 202 were accelerated in an upward direction in FIG. 2b, then mass 207 and plate 206 would be displaced towards sensing electrode 212 as illustrated in cross sectional elevation view of FIG. 3. Conversely, if substrate 202 were accelerated in a downward direction in FIG. 2b, then mass 207 and plate 206 would be displaced away from sensing electrode 212.

Figure 4:
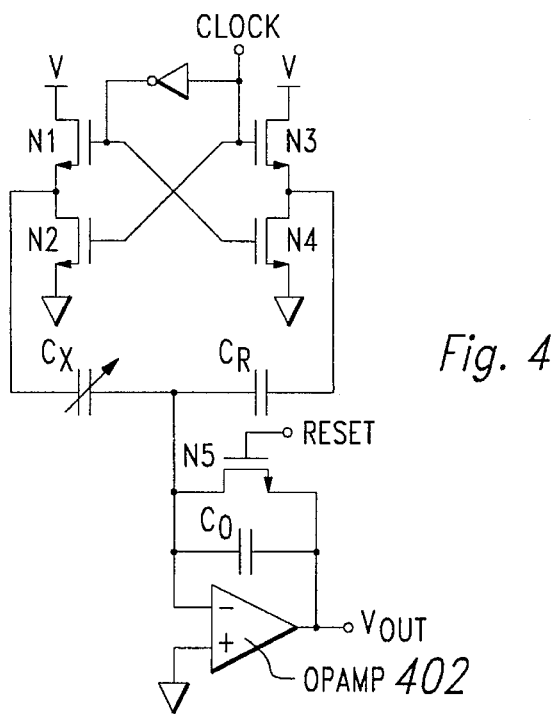
FIG. 4 shows a measurement circuit.

Plate 206 and sensing electrode 212 form an air gap capacitor, and the displacement of plate 206 relative to sensing electrode 212 changes the capacitance of the capacitor. In particular, if the plate and electrode have an area A and are separated by a distance d when there is no acceleration, the capacitance is $A\epsilon/d$ where $A\epsilon/d$ is the permittivity of air. When an acceleration displaces the plate a distance z towards the electrode, the capacitance then changes to $A\epsilon/(d-z)$. The circuitry of FIG. 4 detects this capacitance change and thereby detects the acceleration. In FIG. 4, $C_X$ denotes the variable airgap with plate 206 electrically connected through hinges 208 and posts 204 to supports 222 and then to the inverting input of the operational amplifier OPAMP and with sensing electrode 212 electrically connected to the node between transistors N1 and N2. Similarly, a reference capacitor, which could be a similar deflectable element to element 200 but with no inertial mass and thus negligible displacement during the acceleration and denoted by $C_R$, is connected between the inverting input of opamp 402 and the node between transistors N3 and N4. To have a zero output when the acceleration is zero, the capacitance of $C_R$ and $C_X$ should be equal when there is no displacement. Opamp 402 with capacitor $C_O$ and reset transistor N5 acts to sample and hold the capacitor charge. The signal at the Clock input is a square wave of frequency about 1 MHz and turns transistors N1–N4 off and on, and the signal at the Reset input turns on transistor N5 to discharge capacitor $C_O$ to reset the circuit for each sampling. In particular, initially the signal at Reset is high and the signal at Clock is low, so transistors N1, N4, and N5 are on. Transistor N5 turned on implies that capacitor $C_O$ is discharged and $V_{OUT}$ is at 0 volts; transistor N4 turned on implies capacitor $C_R$ is discharged; and transistor N1 turned on implies capacitor $C_X$ is charged up to V volts and thus contains a charge of $VC_X$. Next, the signal at Reset goes low to let $C_O$ accept charge. Then the signal at Clock goes high to turn off transistors N1 and N4 and turn on transistors N2 and N3. Thus the charge stored on capacitor $C_X$ redistributes to capacitors $C_R$ and $C_O$ because the inverting input of opamp 402 remains at virtual ground. The charge on $C_R$ must be $VC_R$, thus $C_O$ must account for a charge $V(C_X-C_R)$ and hence $V_{OUT} = V(C_X-C_R)/C_O$. With Clock and Reset running at about 1 MHz, the analog output $V_{OUT}$ is sampled every microsecond and the change in capacitance of $C_X$ (and thus displacement of mass 207 relative to electrode 212) can be tracked and analyzed to characterize the acceleration.

The amplitude of the displacement of plate 206 can be computed as follows. Let m be the mass of inertial mass 207 (plate 206 has negligible mass), k be the spring constant of hinges 208, z the displacement of plate 206 towards electrode 212, and g be the acceleration expressed as a multiple of sea level gravitational acceleration (9.8 m/s²). Then Hooke's law states $m \times g \times 9.8$ m/s² = $k \times z$. Now the dimensions and materials determine m and k; namely, the mass of inertial mass 207 for a 100 μm square which is 40 μm thick of nickel (density 8.9) is $8.9 \times 4 \times 10^{-7}$ grams or $3.6 \times 10^{-9}$ kg. The spring constant has been measured to be about 0.9N/m (kg-m/s²-m). Thus the displacement z is equal to $3.6 \times 10^{-9}$ kg×g×9.8 m/s²/0.9 kg-m/s²-m=g×4×10⁻² μm. Thus for an acceleration of ±10 g, the displacement will be about ±0.4 μm. For a displacement of plate 206 towards electrode 212, this will roughly double the capacitance.

The $V_{OUT}$ output of the circuit of FIG. 4 may be nonzero for zero acceleration if capacitors $C_X$ and $C_R$ are mismatched. This is not a problem, because signal conditioning circuitry can store the offset during a selftest and adjust the output accordingly. Alternatively, the biasing voltage (V) of one of the capacitors can be adjusted to compensate for capacitor mismatch.

Fabrication

Figure 5A:
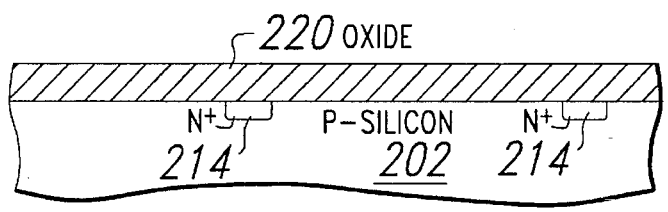
FIGS. 5a–d illustrate in cross sectional elevation views steps in a preferred embodiment method of fabrication.
Figure 5B:
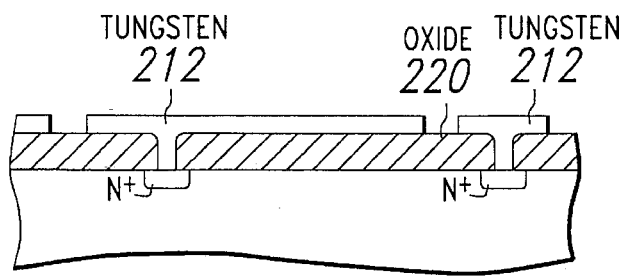
Figure 5C:
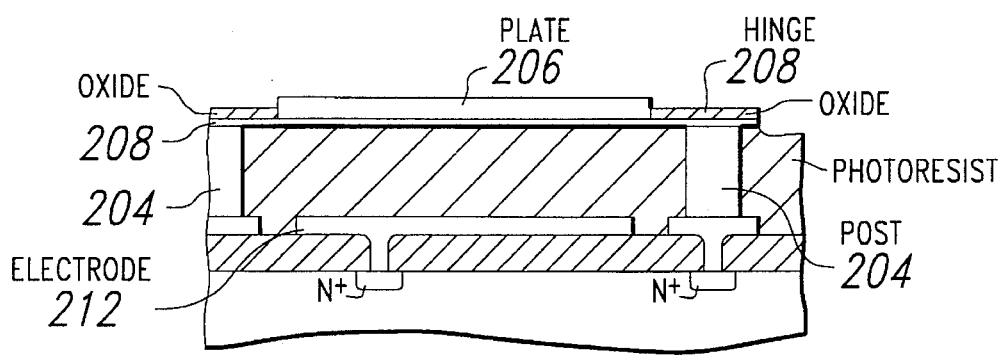

FIGS. 5a–d show steps in a preferred embodiment method of fabrication of deflectable element which include the following:

(1) Begin with a (100) oriented p- silicon wafer and perform CMOS processing to fabricate the signal conditioning and signal processing circuitry, typically polysilicon gate transistors with metal interconnects and oxide insulation. The area for the deflectable elements can be over a p-well (as in FIG. 2b), an n-well, or over field oxide, and the connections from the operational amplifier and transistors in the circuitry of FIG. 4 to sensing electrode 212 and support 222 (and plate 206) may be by buried n± diffusions (as illustrated in FIG. 2b) or could be extensions of the metal layer forming electrode 212 and support 222 plus some other interconnection in the circuitry away from the deflectable elements. FIG. 5a shows diffused connection lines 214 under oxide 220; this could be after CMOS gates have been formed and the first interlevel oxide could be oxide 220.

(2) Lithographically pattern vias in oxide 220 and plasma etch to form the vias. Then deposit CVD tungsten to fill the vias and form a layer about 0.5 μm thick on oxide 220. Pattern and etch the tungsten to form support 222 and electrode 212; these are now connected to the circuitry of FIG. 4 by the diffused lines 214. See FIG. 5b. Other insulation layers and metal interconnections for the CMOS devices away from the deflectable elements can be completed with any depositions in the deflectable element area etched away.

(3) Deposit 1 μm thick aluminum (doped with silicon and titanium) and photolithographically pattern it and anisotropically etch with a chlorine plasma to form posts 204. Next, spin on 1 μm of planarizing photoresist and photolithographically pattern it to expose the tops of posts 204. Then sputter deposit a 0.15 μm thick hinge layer of aluminum, and deposit a 0.3 μm thick layer of low temperature oxide. Pattern the oxide to define the hinges 208. Then sputter deposit a 0.5 μm thick plate layer of aluminum. Photolithographically define plates 206 and etch both aluminum layers, the oxide pattern prevents the etching of the hinge layer aluminum. This forms plate 206 and hinges 208. See FIG. 5c.

(4) Deposit a protective layer of low temperature oxide (0.1 μm thick) and spin on photoresist. Pattern the photoresist and develop it to form an opening for seed layer 205, and remove the exposed protective oxide in the opening with a wet HF etch. Then sputter deposit a 0.01 μm thick layer of nickel, and lift off the photoresist to form nickel seed layer 205. Note that after this liftoff, the protective oxide plus nickel seed layer 205 in the opening in the protective oxide form the top surface of the wafer. Next, submerge the wafer in a water solution of nickel sulfate ($NiSO_4$: a source of nickel ions), sodium hypophosphite ($NaH_2PO_2$: a reducing agent), and sodium acetate ($CH_3COONa$: a buffer and complexing agent). The nickel surface (at first the seed layer 205 and then the growning nickel) catalyzes an electroless plating of nickel according to reactions such as:

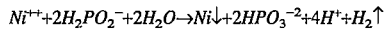

$$Ni^{++}+2H_2PO_2^-+2H_2O \rightarrow Ni\downarrow+2HPO_3^{-2}+4H^++H_2\uparrow$$

Figure 5D:
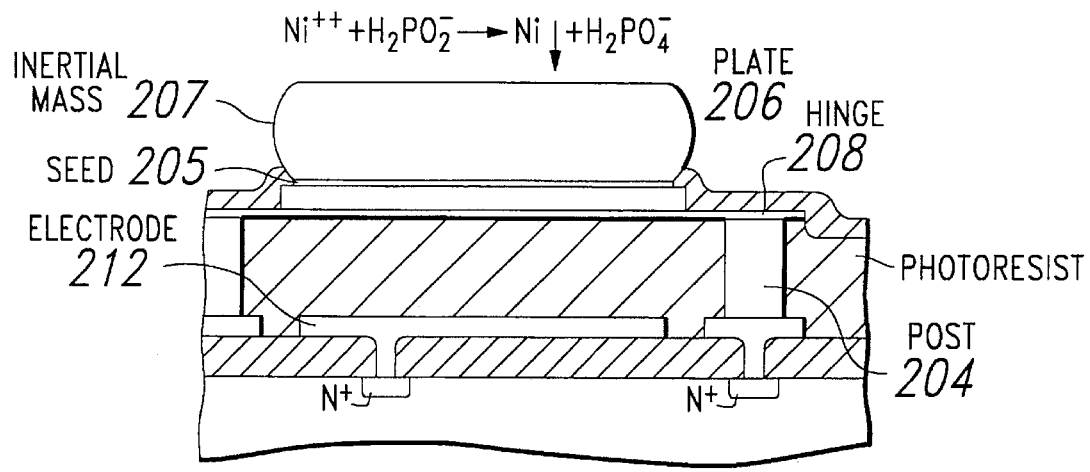

Continue the plating until reaching the thickness of inertial mass 207; see FIG. 5d heuristically showing the plating. Of course, variations of the above reaction are also practical, such as a borate based reducing agent.

Figure 6:
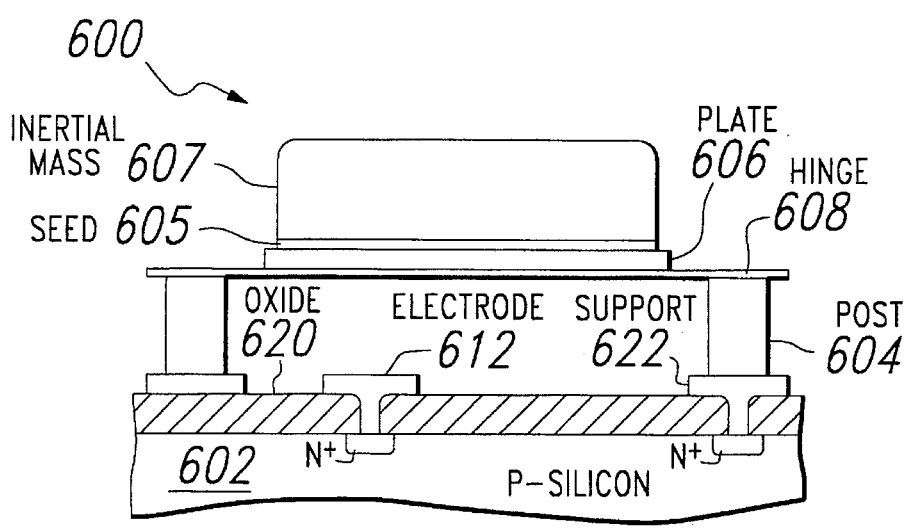
FIG. 6 shows another preferred embodiment in cross sectional elevation view.

The electroless plating typically takes place both laterally and vertically, so the seed layer may not be too close to the edge of plate 206 to avoid growing into an adjacent deflectable element's inertial mass. However, another layer of photoresist patterned with the inverse image of the nickel seed layer could be applied before submerging the wafer in the nickel solution for electroless plating; then this photoresist will prevent lateral nickel plating and inertial mass 207 will have vertical sidewalls as illustrated in FIG. 6. However, the photoresist will need to have a thickness on the order of the inertial mass thickness, so many photoresist layers may be needed. Further, a thin photoresist patterned with the inverse of the nickel seed layer could be used to insure no nucleation and plating away from the nickel seed layer. The timing of the electroless plating sets the thickness of inertial mass 207. After the electroless plating, strip the oxide with HF and then saw the wafer into dice. Lastly, plasma ash the dice to remove the photoresist and complete the deflectable element.

Other metals could be plated instead of nickel, and even electroplating could be used because the posts and aluminum plate provide an electrical connection. Further, variations in the electroless plating chemistry could be made and still yield a good inertial mass: the inertial mass need only be massive, it does not need good electrical properties. For example, nickel seed layer 207 could be omitted and aluminum plate 206 directly used with containment photoresist. In this case the surface of the aluminum could be chemically conditioned to provide the initial reaction catalysis.

Collapse detection

FIG. 6 illustrates in cross sectional elevation view a second preferred embodiment deflectable element, generally denoted with reference numeral 600, which may be used for a digital array measurement of acceleration. In particular, deflectable element 600 has all of the same pans as deflectable element 200 but has sensing electrode 612 in the shape of a small bump or contact centered under plate 606. Indeed, nickel inertial mass 607, nickel seed layer 605, aluminum plate 606, and hinges 608 may have the same dimensions as the corresponding pans of deflectable element 200. However, posts 604 are only 0.4 μm high; thus an acceleration of at least 10 g, which creates a displacement of 0.4 μm, will displace plate 607 to contact electrode 612, and this can be used with the circuit of FIG. 7 for a digital acceleration detection. That is, a sufficiently large acceleration collapses the plate to the underlying electrode and holds it there.

Figure 7:
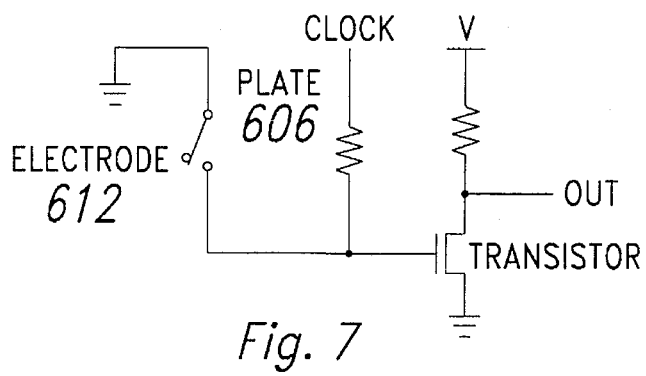
FIG. 7 is another measurement circuit.

In the circuit of FIG. 7 the plate 606 and electrode 612 act as a switch: if the acceleration is less than 10 g, plate 606 remains above electrode 612; so when Clock goes high, the transistor turns on and pulls the OUT voltage low. Contrarily, if the acceleration is at least 10 g, then plate 606 contacts electrode 612 and grounds the gate of the transistor; so when Clock goes high, the transistor does not turn on and OUT remains high. Thus for an acceleration g, an array of deflectable elements 600 with varying inertial masses 607 will have the heavier masses and plates 607 making contact with electrodes 612 and thus lead to OUT low, and the lighter masses and plates not making contact with electrodes and thus leading to OUT high. An array of comparators for adjacent (in mass) deflectable elements will detect the transition in mass from making contact to not making contact, and thereby measure the acceleration.

Torsion deflection element

Figure 8A:
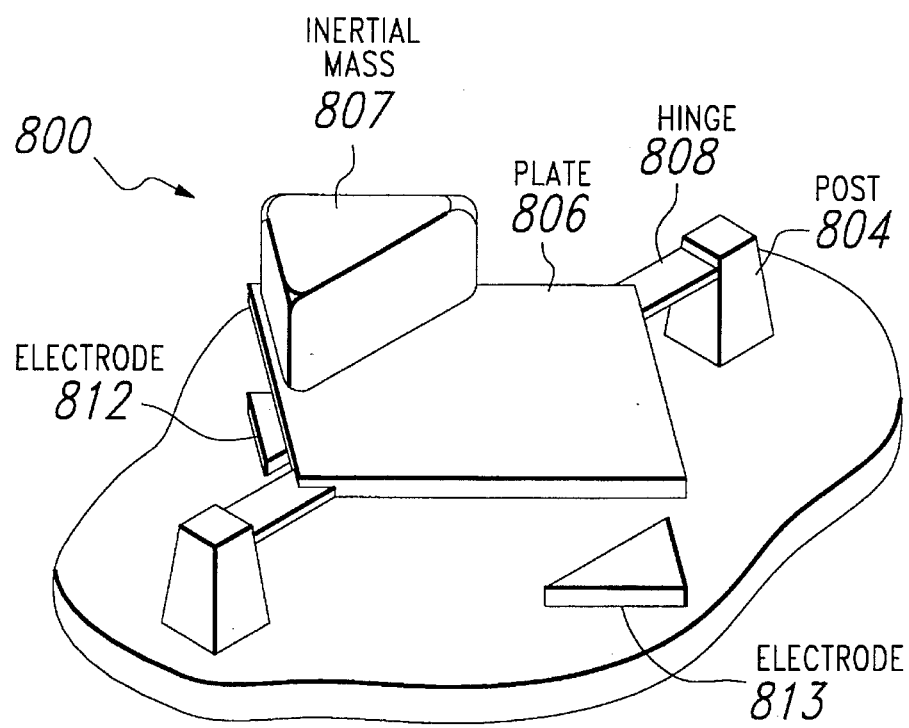
FIGS. 8a–b illustrate another preferred embodiment.
Figure 8B:
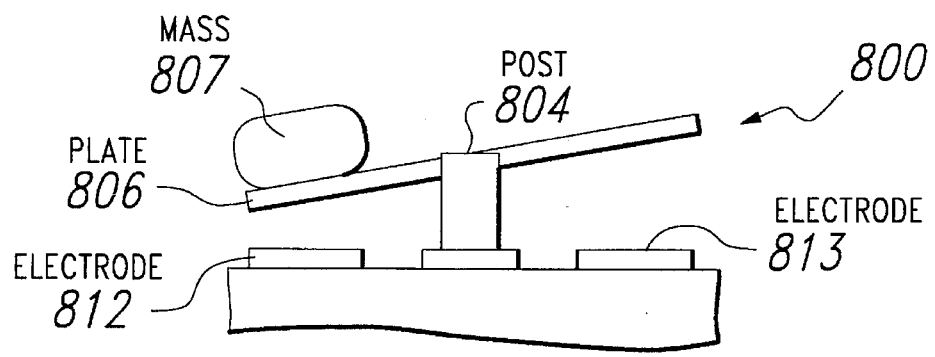

Rather than hinges at each of the four sides so keep plate 206 or 606 parallel to the underlying substrate during displacement, only two hinges with torsion deflection could be used. FIG. 8a shows a perspective view of preferred embodiment deflectable element 800 including square plate 806 with torsion hinges 808 attached to two opposite corners of plate 806 and to posts 804 to suspend the plate over two sensing electrodes 812–813 beneath the other two corners, plus inertial mass 807 positioned at one of the other corners. Thus the mass is asymmetrical, and when the deflectable is accelerated upward in FIG. 8a, the corner with inertial mass 807 is displaced towards electrode 812 as illustrated in cross sectional elevation view in FIG. 8b. Conversely, with an acceleration downward in FIG. 8a, the inertial mass 807 is displaced away from electrode 812 and the opposite corner of plate 806 is displaced towards electrode 813.

Deflectable element 800 may be connected for capacitance measurement of accelerations (airgap capacitor made of plate 806 and electrode 812, or made of plate 806 and electrode 813, or both) as with deflectable element 200. Or deflectable element 800 may be part of an array with digital acceleration measurement by detecting plate 806 making contact with electrode 812 or electrode 813. Indeed, with deflectable element 800 the measurement of acceleration upwards or downwards may be symmetrically performed.

Spacer supported torsion

Figure 9A:
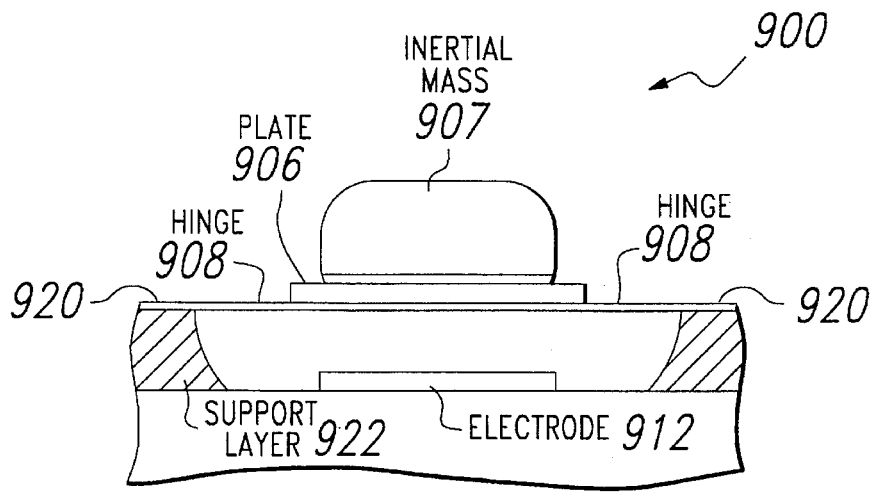
FIGS. 9a–b illustrate a further preferred embodiment.
Figure 9B:
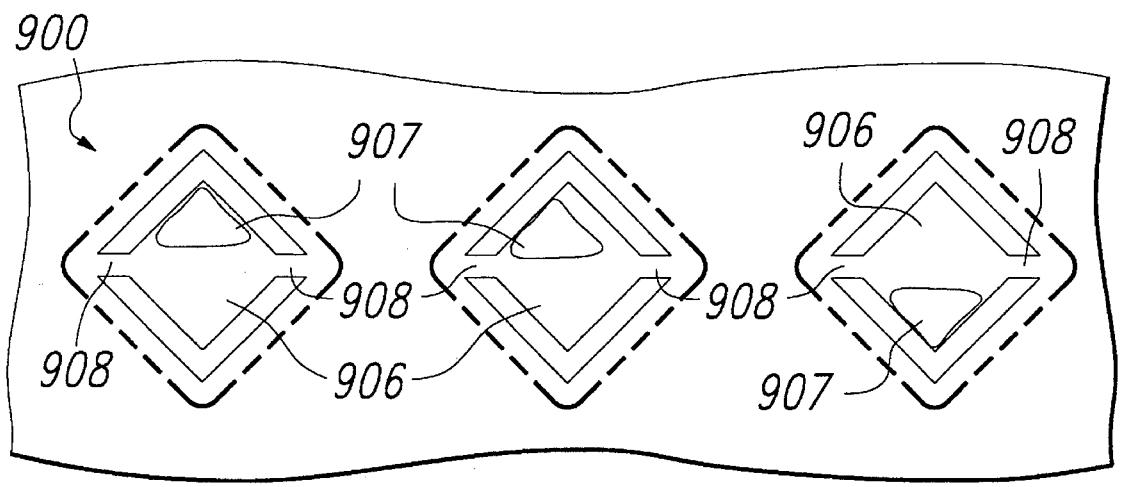

FIG. 9a shows another preferred embodiment deflectable element, generally denoted by reference numeral 900, in cross sectional elevation view and FIG. 9b shows an array of such elements 900 in plan view. Deflectable element 900 resembles deflectable element 800 in that the displaceable plates 906 are suspended by torsion hinges 908 over sensing electrode 912, but in deflectable element 900 hinges 908 are part of a single metal layer 920 on support layer 922 (which may be PMMA) with wells etched in support layer 922 to allow for displacement by plates 906. The dotted lines in FIG. 9b indicate the extent of the wells in support layer 922. Again, sensing electrode 912 may be used for capacitance sensing as with deflectable element 200 and the circuit of FIG. 4 or for electrical contact as with deflectable element 600 and the circuit of FIG. 7.

Modifications

The preferred embodiments may be varied in many ways while retaining one or more of the features of For example, the dimensions (areas and thicknesses) of the hinges, inertial masses, plates, and sensing electrodes, and the post heights can all be varied. Thinner, narrower, and longer hinges imply a smaller spring constant and sensitivity to smaller accelerations. A larger inertial mass also implies sensitivity to smaller accelerations. The plates could have nonsquare shapes, such as circular. The torsion hinged plates could have the hinges at opposite sides rather than corners. The arrays of deflectable elements may have various orientations for close packing: the array of FIG. 9b could have the hinges perpendicular to the row of deflectable elements, and the plates could then be over a single long well in the support layer.

What is claimed is:

1. An accelerometer, comprising:
   (a) a plate suspended over an electrode by a set of hinges, each of said hinges is affixed to a corresponding post extending from a plane including said electrode;
   (b) an inertial mass on said plate, said inertial mass characterized as a material plated onto said plate; and
   (c) sensing circuitry connected between said hinges and said electrode.
2. The accelerometer of claim 1, wherein:
   (a) said electrode is planar; and
   (b) said set of hinges is four hinges and said plate is suspended parallel to said electrode.
3. The accelerometer of claim 2, wherein:
   (a) said sensing circuitry includes a capacitance detector coupled to said plate and said electrode.
4. The accelerometer of claim 3, wherein:
   (a) said inertial mass includes electrolessly plated nickel; and
   (b) said plate includes a seed layer for said inertial mass.
5. The accelerometer of claim 1, wherein:
   (a) said electrode is centered under said plate; and
   (b) said set of hinges is four hinges and said plate is suspended parallel to said electrode.
6. The accelerometer of claim 5, wherein:
   (a) said sensing circuitry includes a contact detector coupled to said plate and said electrode.
7. The accelerometer of claim 6, wherein:
   (a) said inertial mass includes electrolessly plated nickel; and
   (b) said plate includes a seed layer for said inertial mass.
8. The accelerometer of claim 1, wherein:
   (a) said set of hinges is two hinges; and
   (b) said electrode is under said plate and to one side of a line connecting said two hinges.
9. The accelerometer of claim 8, wherein:
   (a) said sensing circuitry includes a contact detector coupled to said plate and said electrode.
10. The accelerometer of claim 9, wherein:
    (a) said inertial mass includes electrolessly plated nickel; and
    (b) said plate includes a seed layer for said inertial mass.

* * * * *